(12) United States Patent
Commis et al.

(10) Patent No.: US 10,946,951 B2
(45) Date of Patent: Mar. 16, 2021

(54) WINGLET AND METHOD OF DESIGNING A WINGLET

(71) Applicants: Airbus Operations Limited, Bristol (GB); Airbus Operations GmbH, Hamburg (DE)

(72) Inventors: Ben Commis, Bristol (GB); Christopher Wright, Bristol (GB); Kasidit Leoviriyakit, Bristol (GB); Gerd Heller, Hamburg (DE)

(73) Assignees: AIRBUS OPERATIONS LIMITED, Bristol (GB); AIRBUS OPERATIONS GMBH, Hamburg (DE)

( * ) Notice: Subject to any disclaimer, the term of this patent is extended or adjusted under 35 U.S.C. 154(b) by 174 days.

(21) Appl. No.: 15/899,714

(22) Filed: Feb. 20, 2018

(65) Prior Publication Data
US 2018/0237128 A1 Aug. 23, 2018

(30) Foreign Application Priority Data

Feb. 22, 2017 (GB) .................................... 1702834

(51) Int. Cl.
*B64C 23/06* (2006.01)
*B64C 5/08* (2006.01)
*B64C 3/58* (2006.01)

(52) U.S. Cl.
CPC .............. *B64C 23/069* (2017.05); *B64C 5/08* (2013.01); *B64C 23/065* (2013.01); *B64C 3/58* (2013.01); *Y02T 50/10* (2013.01)

(58) Field of Classification Search
CPC ........ B64C 23/069; B64C 5/08; B64C 23/065
See application file for complete search history.

(56) References Cited

U.S. PATENT DOCUMENTS

| 2,418,301 A | * | 4/1947 | Heal | ......................... B64C 3/42 244/91 |
| 2,576,981 A | | 12/1951 | Vogt | |

(Continued)

FOREIGN PATENT DOCUMENTS

| EP | 1 493 660 | 1/2005 |
| EP | 2 441 670 | 4/2012 |

(Continued)

OTHER PUBLICATIONS

European Search Report cited in EP 18155885.9, dated Jun. 14, 2018, 11 pages.
Combined Search and Examination Report for GB1702834.1, dated Jul. 20, 2017, 7 pages.

*Primary Examiner* — Justin M Benedik
(74) *Attorney, Agent, or Firm* — Nixon & Vanderhye P.C.

(57) ABSTRACT

An aircraft (5) including a wing (3) and a winglet (1) at the end of the wing, the winglet including: a root (7); a tip (9); a transition region (11) extending away from the root; and a wing-like region (13) extending from the distal end of the transition region to the tip. When the aircraft wing (3) is under the worst-case static loading, the tip of the winglet is located at the maximum spanwise extent of the winglet (1), but when the aircraft wing (3) is under the no-load condition, the wing-like region (13) is canted inboard such that the tip (9) of the winglet (1) is located inboard of the maximum spanwise extent of the winglet.

8 Claims, 8 Drawing Sheets

(56) References Cited

U.S. PATENT DOCUMENTS

| | | | | |
|---|---|---|---|---|
| 4,776,542 A | * | 10/1988 | Van Dam | B64C 3/10 244/198 |
| 5,039,032 A | * | 8/1991 | Rudolph | B64C 3/10 244/35 R |
| 5,275,358 A | | 1/1994 | Goldhammer et al. | |
| 5,348,253 A | * | 9/1994 | Gratzer | B64C 23/069 244/91 |
| 6,089,502 A | * | 7/2000 | Herrick | B64C 3/10 244/35 R |
| 6,484,968 B2 | | 11/2002 | Felker | |
| 9,033,282 B2 | * | 5/2015 | Wright | B64C 23/065 244/199.4 |
| 2005/0133672 A1 | * | 6/2005 | Irving | B64C 23/072 244/201 |
| 2013/0256460 A1 | * | 10/2013 | Roman | B64C 23/069 244/199.4 |
| 2014/0117151 A1 | * | 5/2014 | Fox | B64C 23/072 244/49 |

FOREIGN PATENT DOCUMENTS

| | | |
|---|---|---|
| WO | WO 2008/061739 | 5/2008 |
| WO | WO 2008/100286 | 8/2008 |
| WO | WO 2008/155566 | 12/2008 |
| WO | WO 2012/007358 | 1/2012 |
| WO | WO 2012/171023 | 12/2012 |
| WO | WO 2013/151810 | 10/2013 |
| WO | WO-2013151810 A1 * | 10/2013 |
| WO | WO 2015/150835 | 10/2015 |
| WO | WO 2015/162399 | 10/2015 |

\* cited by examiner

WINGLET AND METHOD OF DESIGNING A WINGLET

RELATED APPLICATION

This application claims priority to United Kingdom patent application GB 1702834.1 filed Feb. 22, 2017, the entirety of which is incorporated by reference.

The present disclosure relates to a winglet for an aircraft, to a method of designing a winglet, a method of manufacturing a winglet, and a winglet designed and/or manufactured using such methods.

BACKGROUND OF THE INVENTION

Winglets are well-known and can take a number of forms. Examples of winglets, or wing tip devices incorporating winglets, are shown in U.S. Pat. Nos. 5,348,253, 6,484,968, WO 2008/061739, WO 2008/155566, WO 2012/007358, U.S. Pat. No. 5,275,358, and WO 2012/171023. Generally speaking, winglets seek to reduce induced drag by increasing the effective span of the aircraft to which they are fitted.

The maximum aircraft span is effectively limited (for a given ICAO Annex 14 aerodrome code letter) by airport operating rules which govern various clearances required when manoeuvring around the airport (such as the span and/or ground clearance required for gate entry and safe taxiway usage). For some high-span aircraft, designers have considered moving away from using fixed wing tip devices, and have instead focussed on providing a moveable wing tip device which is moveable between a flight configuration (beyond the allowable gate limit span) and a ground configuration (in which ground configuration the wing tip device is moved away from the flight configuration such that the span of the aircraft is reduced to within the gate limit). Examples, of such moveable wing tip devices can be found in WO2015150835 or WO2015162399.

Nonetheless, there is also still a desire to provide a fixed wing tip device that is suitable for use on a high-span aircraft. An example of a fixed wing tip device for use on a high-span aircraft is shown in WO 2012/007358. In this arrangement, the upper wing-like element of the wing tip device meets a span limit when the aircraft is on the ground, and under 1-g flight loading a lower wing-like element is arranged to offset some of the span decrease that occurs as the wing is aero-elastically deformed causing the upper wing-like element to move inboard. US 2013/0256460 discloses another arrangement having fixed upper and lower winglets, but one in which the lower winglet is arranged to increase the overall span under 1-g flight loading.

It will be appreciated from the above that when facing size constraints imposed on span, the design of wing tip devices has recently tended to focus either on providing a moveable wing tip device, or on providing devices with both upper and lower winglets.

When designing wing tip devices, the shape of the wing tip device is often considered based on the so-called 'jig-shape' (i.e. the shape under no-load conditions). Many disclosures of wing tip devices tend to be shown in this jig-shape. For example, U.S. Pat. No. 5,275,358 discloses the shape of the winglets in their 'no-load' state.

In reality, the shape of a wing tip device tends to be governed by the operating conditions of the aircraft on which it is being used. For example, the shape and orientation of a wing tip device tends to differ from the jig shape when the wing is under a 1-g flight condition (under which the wing and winglet are aero-elastically deflected) or when the wing is under a static load condition when the aircraft is stationary at the airport (under which the wing tends to be elastically deflected by its own structural weight and fuel-load weight). Designing to the jig shape is beneficial as it matches the shape of the wing tip device as manufactured. However, in reality, the shape and/or orientation of the wing tip device may not exactly match the jig shape once it is installed on the aircraft wing.

Aspects of the present invention seek to provide an improved wing tip device, especially when facing constraints on span.

SUMMARY OF THE INVENTION

According to a first aspect of the invention, there is provided an aircraft comprising a wing and a winglet at the end of the wing, the winglet comprising: a root; a tip; a transition region extending away from the root; and a wing-like region extending from the distal end of the transition region to the tip, wherein when the aircraft wing is under the worst-case static loading, the tip of the winglet is located at the maximum spanwise extent of the winglet, but when the aircraft wing is under the no-load condition, the wing-like region is canted inboard such that the tip of the winglet is located inboard of the maximum spanwise extent of the winglet.

The present invention recognises that a beneficial winglet design can be obtained by considering the span of the winglet when the wing is under the worst-case static loading conditions. More specifically, by ensuring the winglet tip is at the maximum spanwise extent when the wing is under worst-case static loading, the aircraft should always be complying with airport compatibility gate limits, whilst optimising the position of the winglet tip. Furthermore, by having the wing-like region canted inboard in the no-load condition (such that the tip of the winglet is located inboard of the maximum spanwise extent of the winglet) a winglet with a relatively long unrolled length may be obtained (discussed in more detail below).

The worst-case static loading will be readily understood by the skilled person. It is typically the highest static loading the aircraft wing would be expected to encounter during normal use (for example when the aircraft is stationary on the ground, and fully fuelled).

Reference herein to the 'maximum spanwise extent of the winglet' will be understood to mean the most outwardly-located structure of the winglet under the corresponding specified load condition. The part of the winglet that is located at that maximum spanwise extent may change in dependence of the load condition of the wing (for example the maximum spanwise extent may be at the winglet tip when the aircraft wing is under the worst-case static load, but may be located lower down the winglet (e.g. distal from the tip) when the aircraft wing is under the no-load condition.

It will be appreciated that the winglet is a 3-dimensional structure. The tip of the winglet is considered to be located at the maximum spanwise extent of the winglet when the lower (outer-most) surface of the tip is at the maximum spanwise extent (even though the upper (inner-most) surface, and leading edge, at the tip will necessarily be slightly inboard of that due to the thickness of the structure). The tip of the winglet will be readily identifiable, and may include a tip cap.

It will be appreciated that the span of the aircraft may be different depending on the load condition that the wing is under. The span of the maximum spanwise extent of the winglet when the aircraft wing is under worst-case static loading, is preferably a parameter set by an airport compatibility limit (for example relating to clearance restrictions for buildings, signs, other aircraft). The compatibility limit is preferably a gate limit. The span of the maximum spanwise extent of the winglet when the aircraft wing is under no-load may be less than the compatibility limit.

The winglet is a fixed winglet. Reference to the wing-like region being canted inboard under the no-load condition, will be understood to refer to a 'passive' change (i.e. a change in cant due to the different load conditions) rather than any actuated, or moveable components per se on the winglet.

The wing-like region may be curved. In embodiments in which the wing-like region is curved, the wing-like region may be an extension of the transition region. The wing-like region may be less curved than the transition region. In preferred embodiments of the invention, the wing-like region may comprise a planar portion. The planar portion may extend away from the tip. The planar portion may include the winglet tip. When the aircraft wing is under worst-case static loading, the planar portion may extend vertically downward from the winglet tip, and preferably such that it lies along the maximum spanwise extent of the winglet. In the no-load condition the planar portion may be canted inboard beyond the vertical. Providing a planar portion extending along the span limit (in the worst-case static loading conditions) has been found to facilitate a relatively long un-rolled length of winglet because it 'pushes' the transition region outboard which, when the root and tip locations are fixed, increases the length between these end points and hence the unrolled length of the winglet (see FIGS. 1 to 6b, and especially 6a and 6b described below).

In some embodiments, all of the wing-like region may be substantially planar. The transition region is preferably curved. The substantially planar portion may extend tangentially from the distal end of the curved transition region. The substantially planar portion need not necessarily be exactly planar. For example, the substantially planar portion may be part of a conic section that has a sufficiently high radius that it can be considered as substantially planar.

During flight, the aircraft wing is subjected to loading, and tends to undergo aero-elastic deformation. When the aircraft wing is under the 1-g flight conditions, the wing-like region may be canted further inboard, relative to when the aircraft wing is under the no-load condition, such that the tip of the winglet is located yet further inboard of the maximum span of the winglet.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a second aspect of the invention, there is provided a method of designing a winglet for an aircraft wing, the method comprising the steps of: (i) designing the winglet such that when the aircraft wing is under worst-case static loading, the tip of the winglet is located at the maximum span of the winglet, (ii) designing the required jig shape of the winglet to achieve the winglet design of step (i). By designing for the worst-case static load condition, and then designing the required jig-shape (i.e. for the no-load condition), the winglet should always be complying with airport compatibility gate limits in use, but may have an optimised shape to reach that span. The step of designing the jig-shape (step (ii)) is preferably subsequent to step (i).

The step of designing for the worst-case static load condition may comprise the step of orientating a planar portion vertically downwards from the winglet tip along the maximum spanwise extent of the winglet.

The step of designing the jig-shape may comprise the step of canting the wing-like region inboard such that the tip of the winglet is located inboard of the maximum spanwise extent of the winglet.

According to another aspect of the invention, there is provided a method of manufacturing a winglet using the method of the above-mentioned aspect and subsequently manufacturing the winglet to that design.

According to another aspect of the invention, there is provided a winglet designed using the above-mentioned method.

According to another aspect of the invention, there is provided a winglet manufactured using the above-mentioned method.

According to yet another aspect of the invention, there is provided an aircraft comprising a wing and a winglet at the end of the wing, wherein when the aircraft wing is under the worst-case static loading, the winglet extends substantially vertically along an airport gate compatibility limit span, but when the aircraft wing is under the no-load condition, the winglet is canted inboard such that the tip of the winglet is located inboard of the maximum spanwise extent of the winglet.

It will be appreciated that, unless otherwise specified, the shape of the winglet (or parts thereof) referred to herein, refers to the shape in a frontal projection (i.e. on to a y-z plane). The shape of the winglet may be defined by the ¼ chord line running along the winglet. The cant may be measured relative to the vertical (i.e. the y-axis). The y axis is preferably in an absolute reference frame.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
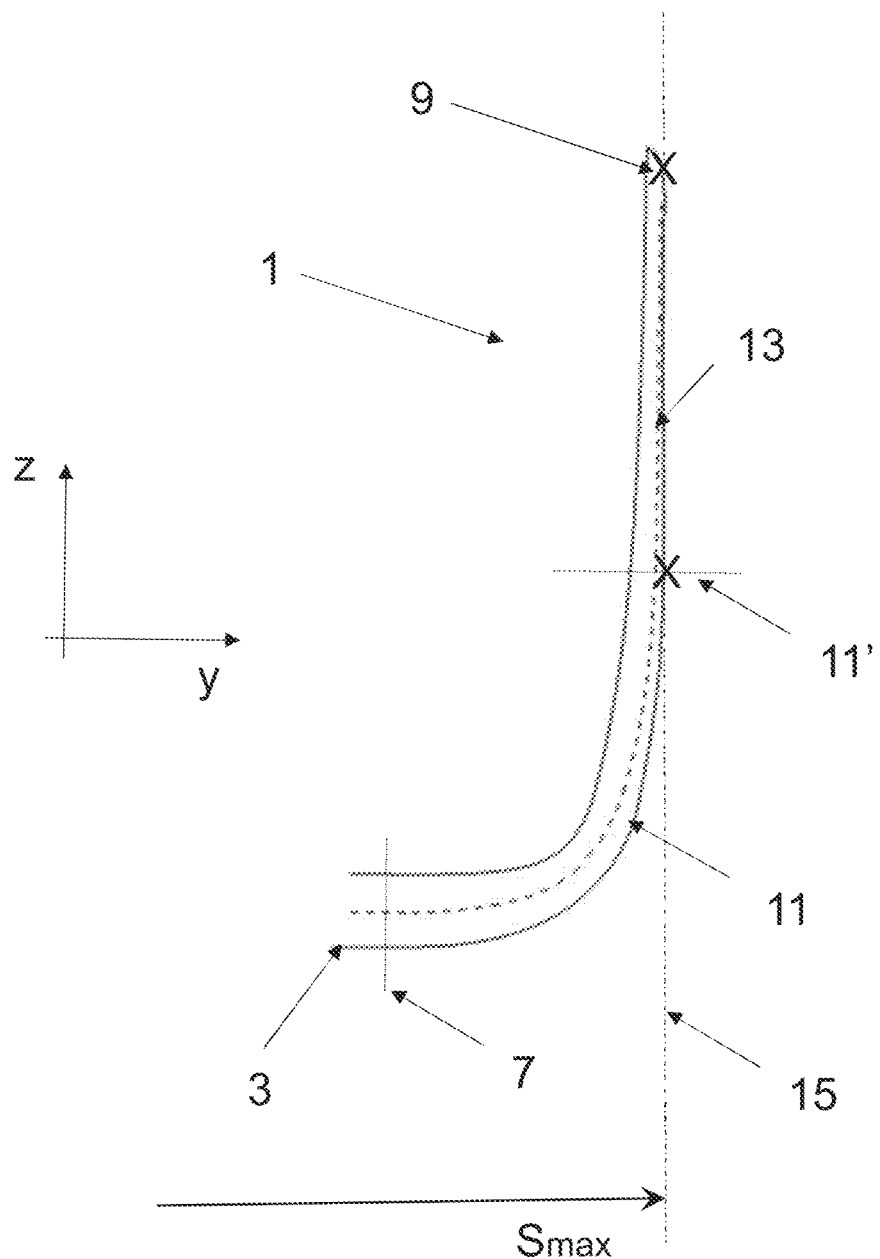
FIG. 1 shows a frontal view of a winglet on a wing of an aircraft according to a first embodiment of the invention, the aircraft wing being under a worst-case static load.
Figure 5:
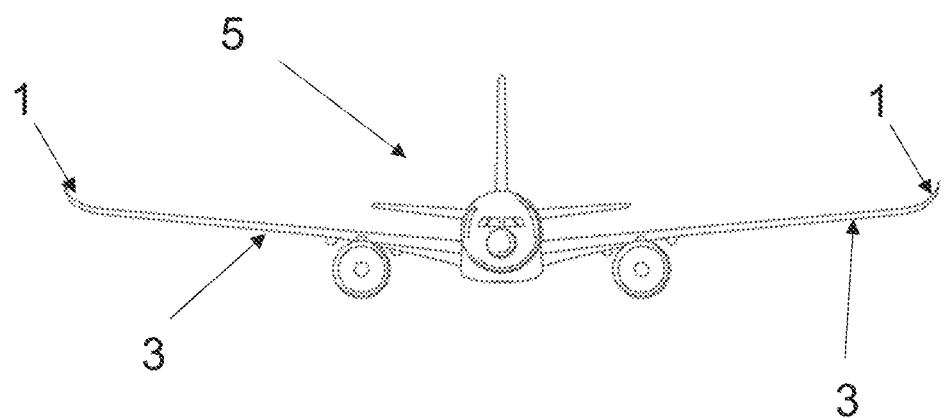
FIG. 5 shows a frontal view of the aircraft in the first embodiment of the invention.

FIG. 1 shows a frontal view (i.e. in the y-z plane) of a winglet 1 at the end of a wing 3 of an aircraft 5 according to a first embodiment of the invention (the aircraft being shown schematically in FIG. 5) The winglet comprises a root 7, a tip 9, a curved transition region 11, and an upwardly extending, substantially planar, wing-like region 13 extending from the distal end 11' of the transition region 11 to the tip 9. The leading edge of the winglet is shown as a dashed line.

In FIG. 1, the wing 3 is shown with the aircraft stationary on the ground and with a full fuel load (i.e. the worst-case static load). Under this load condition, the planar portion 13 extends vertically downwards from the tip 9. As indicated by the vertical dashed line 15, the maximum spanwise extent of the winglet 1 is therefore defined by the winglet tip 9 and the vertical planar portion 13 extending downwardly therefrom (marked between two X's in FIG. 1).

It is desirable to maximise the effective length of the wing within the confines of any airport restrictions on wing span. Accordingly, the tip 9 and the vertical portion 13 are also at the maximum span (Smax) set by the airport gate compatibility limit (e.g. see wing spans in FAA groups I to IV or ICAO codes A to F).

Figure 2:
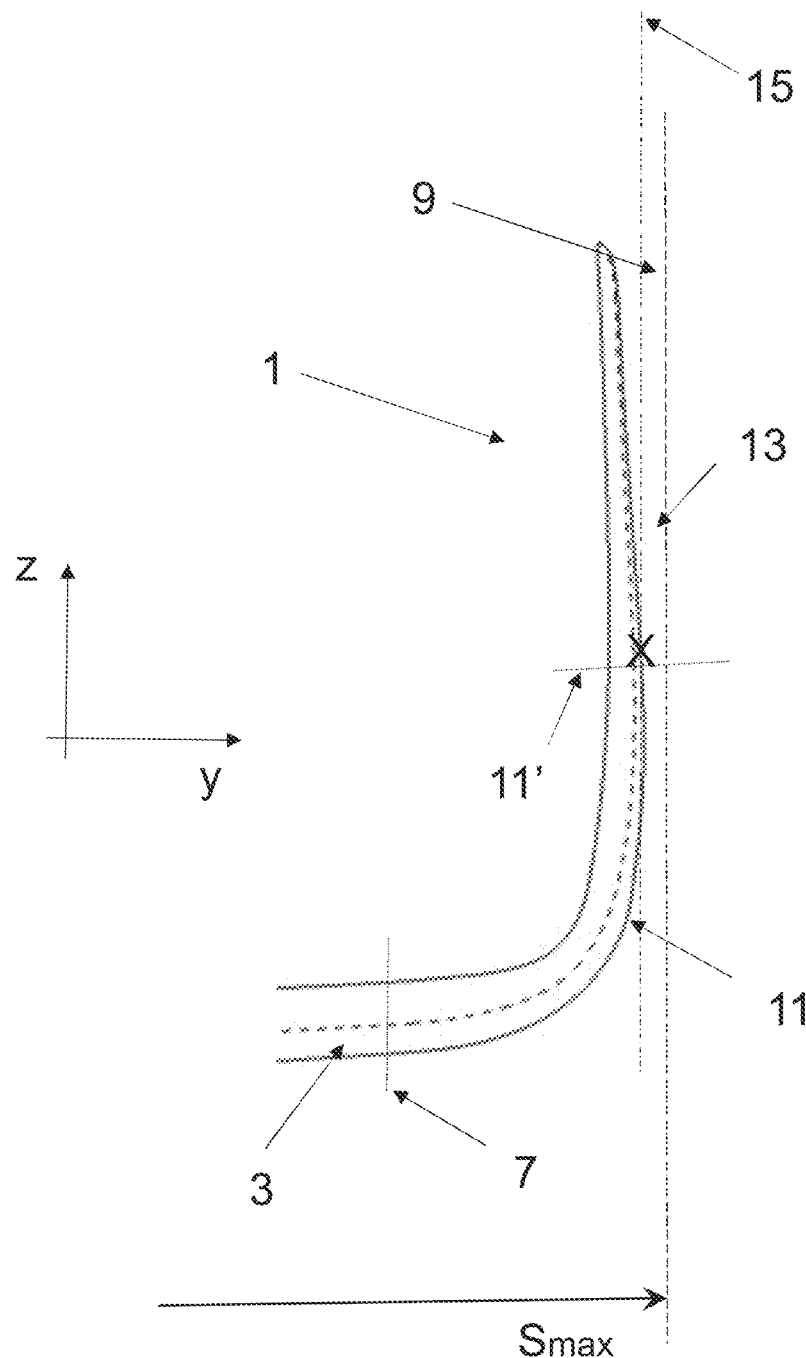
FIG. 2 shows a frontal view of the winglet of FIG. 1 in a no-load condition.

In FIG. 2, the wing 3 and winglet 1 are shown in a no-load condition (i.e. in their jig shape). In the jig shape, the planar portion 13 in canted inwardly such that the tip 9 is moved inboard (relative to the worst-case static load condition). Accordingly, the maximum spanwise extent of the winglet 1 is then shifted lower down the winglet 1 to the junction 11' between the transition region 11 and the planar portion 13 (marked with an X in FIG. 2). The magnitude of that span is also slightly reduced (see FIG. 6a).

Figure 3:
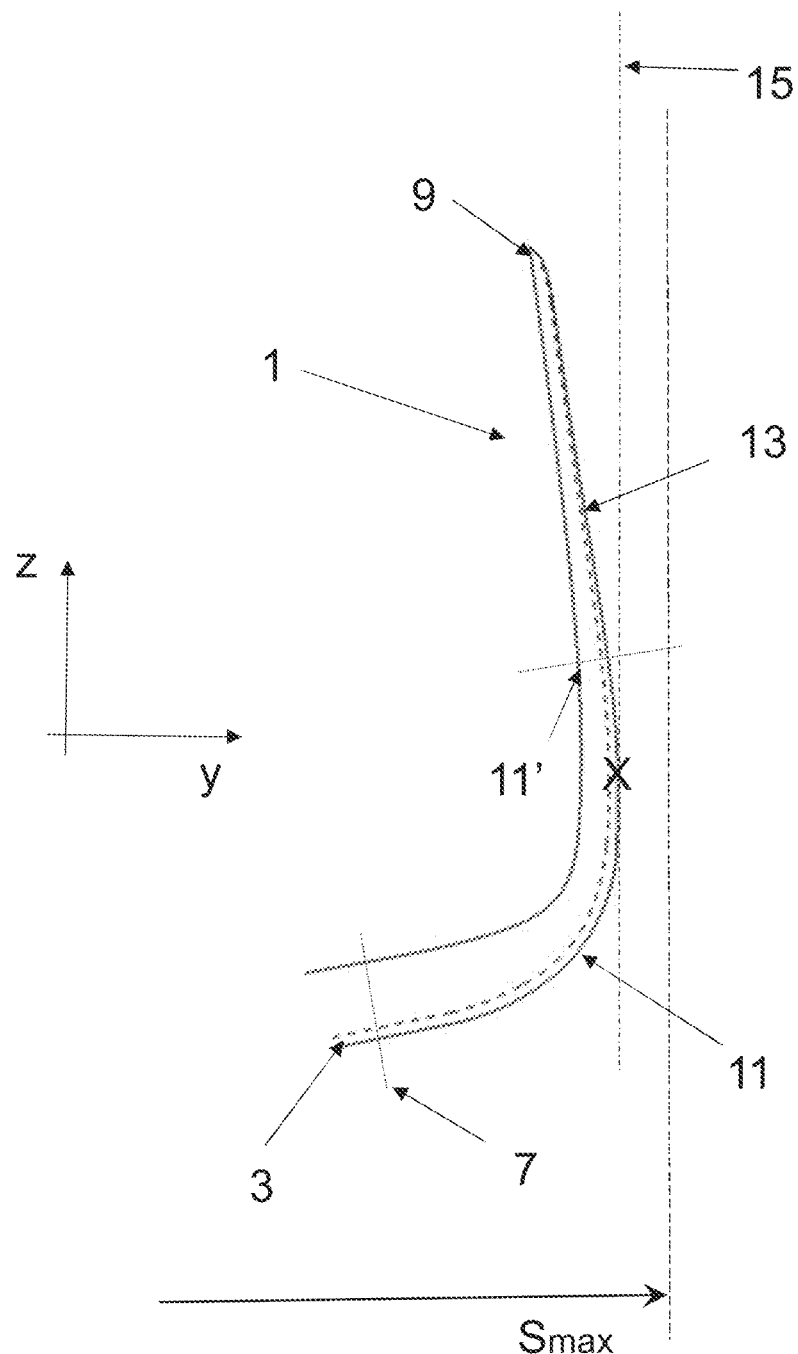
FIG. 3 shows a frontal view of the winglet of FIG. 1, the aircraft being under a 1-g flight condition.

In FIG. 3, the wing 3 and winglet 1 are shown in a 1-g flight condition. In the flight condition, the wing 3 is flexed upwards under aero-elastic loading and the planar portion 13 in canted further inward such that the tip 9 is moved further inboard (relative to the worst-case static load condition and the no-load condition). The maximum spanwise extent of the winglet is shifted onto the transition region 11 (marked with an X in FIG. 3). The magnitude of that span is also further reduced.

Figure 4:
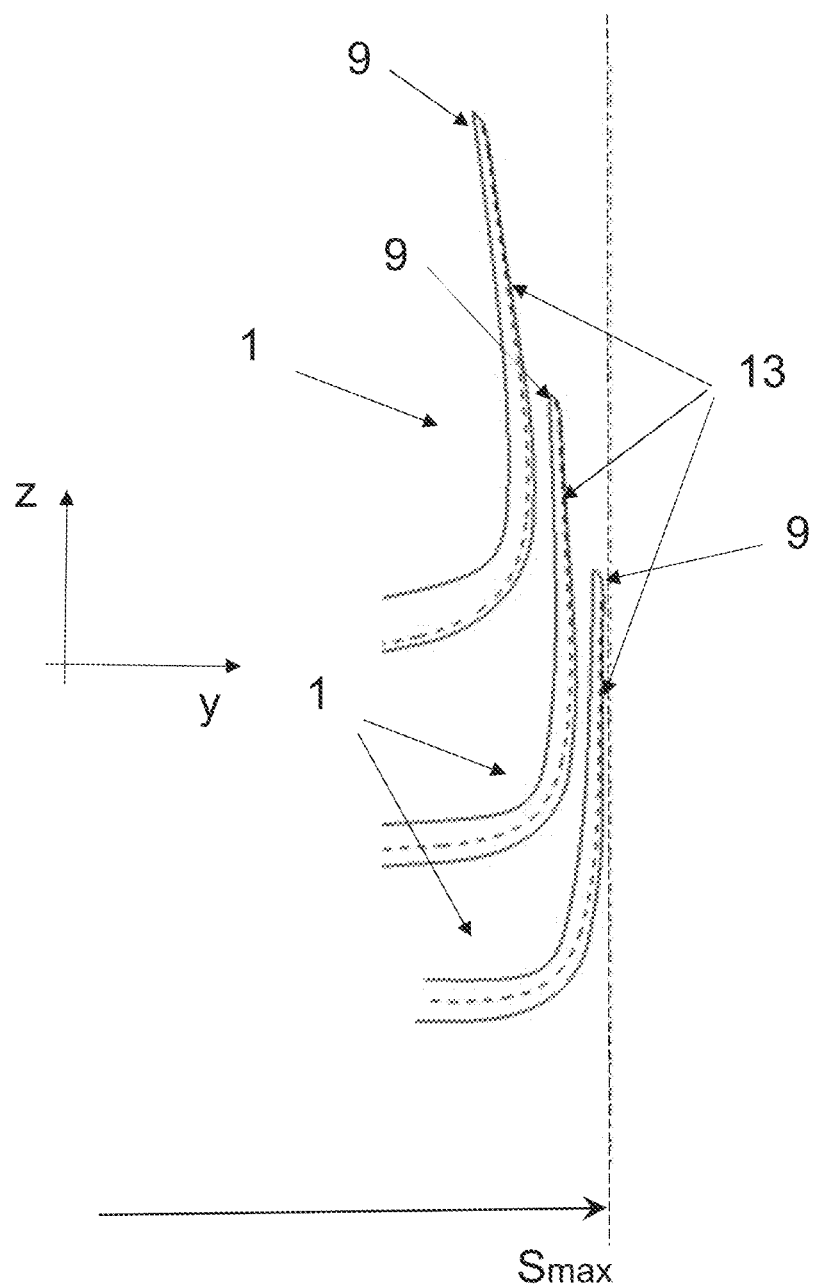
FIG. 4 overlays the winglets of FIGS. 1 to 3 in one image.

FIG. 4 overlays the images of the winglet in the three load conditions of FIGS. 1 to 3, which illustrates the above-mentioned changes in the magnitude of the span and the location of the point of maximum span on the winglet.

As is evident from FIG. 4, the winglet tip 9 and planar portion 13 are at the maximum spanwise extent when the wing is under worst-case static loading, but are canted inboard (sometimes referred to as being 'over-canted') in the jig shape. This arrangement is beneficial. Firstly, it ensures the aircraft should always be complying with airport compatibility gate limits as it is sized for the worst-case load scenario. Secondly, by providing the tip and planar portion extending along the span limit (in the worst-case static loading conditions) the total un-rolled length of winglet is relatively long because it 'pushes' the transition region outboard which, when the root and tip locations are fixed, increases the length between these end points, and hence increases the unrolled length of the winglet.

Figure 6A:
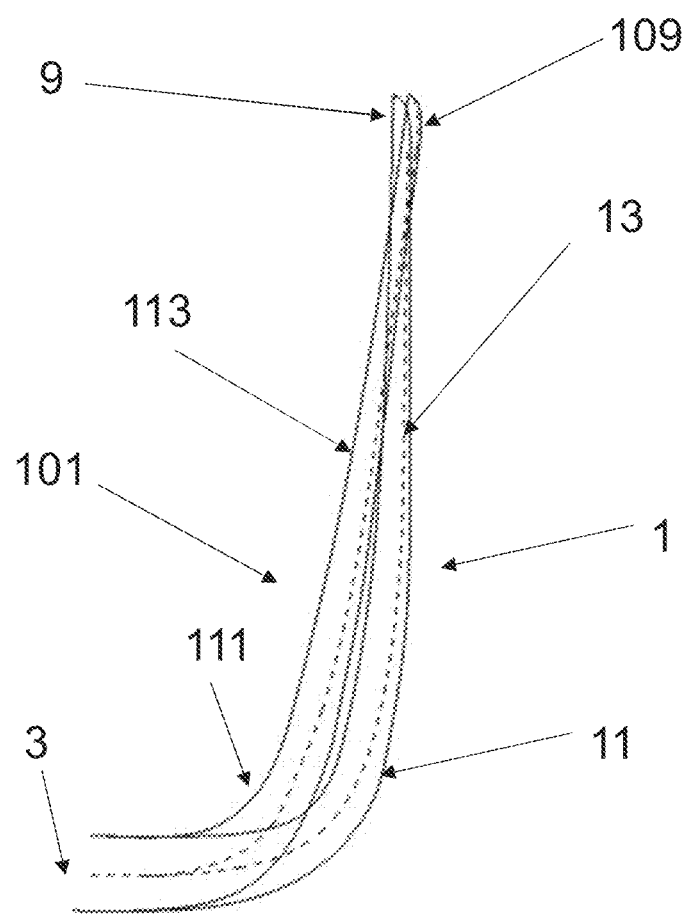
FIG. 6a shows a comparison between a previously-suggested winglet and the winglet of FIG. 1, when the aircraft is under a worst-case static load.
Figure 6B:
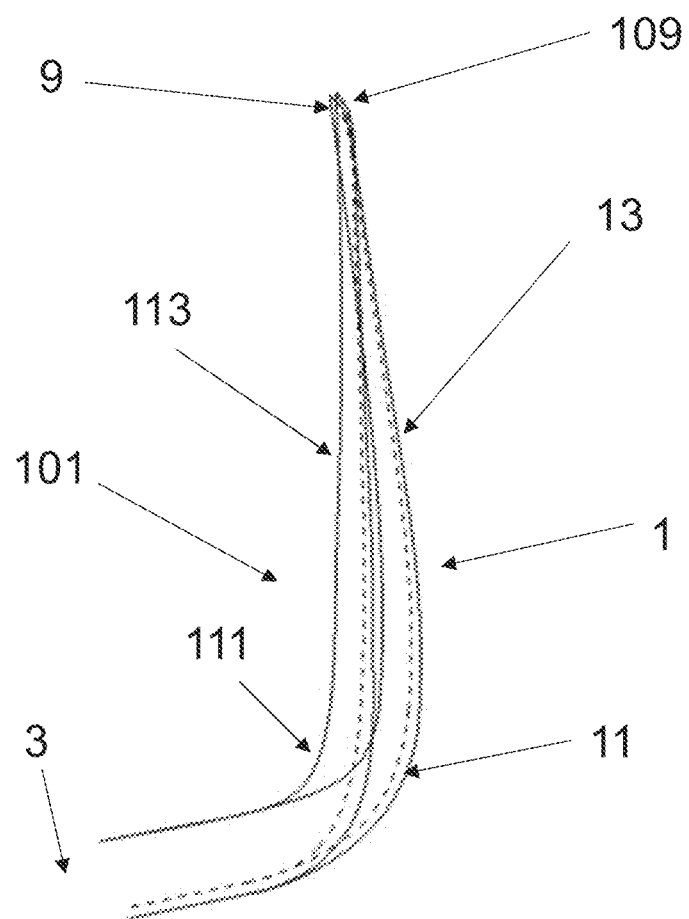
FIG. 6b shows a comparison between the previously-suggested winglet and the winglet of FIG. 1, when the aircraft is under a 1-g flight condition.

These benefits can be seen in FIGS. 6a and 6b which compare the winglet 1 of the first embodiment of the invention with a previously suggested winglet 101 (shown on the left-most side of FIG. 6a/6b). Referring first to FIG. 6a the winglets 1, 101 are shown overlaid with one another when attached to a common wing 3. FIG. 6a shows the wing under a worst-case static load.

It can be seen from FIG. 6a that the transition region 11 on the winglet of the first embodiment of the invention is necessarily further outboard (than the region 111 on the previously suggested winglet 101) in order to blend into the vertical planar portion 13. Since the root 3 and tip 9, 109 locations are largely the same for both winglets 1, 101 the unrolled length of the winglet 1 of the first embodiment is longer than the unrolled length of the previously suggested winglet 101. This provides a winglet with a longer effective length, and with a more open transition region, both of which give rise to improved aerodynamic performance (primarily in terms of a drag reduction).

FIG. 6b shows the wing under a 1-g flight load. It can be seen that in this load condition, the previously suggested winglet 101 has a planar portion 113 that is essentially vertical, whereas on the winglet of the first embodiment of the invention, the tip 9 of the winglet is moved inboard such that the planar portion 13 is over-canted. The maximum spanwise extent of the winglet 1 is moved lower down the winglet to the transition region. Thus, the tips 9, 109 of the two different winglets are essentially coincident at this load condition, yet the total span of the aircraft is greater with the winglet of the first embodiment of the invention.

Figure 7:
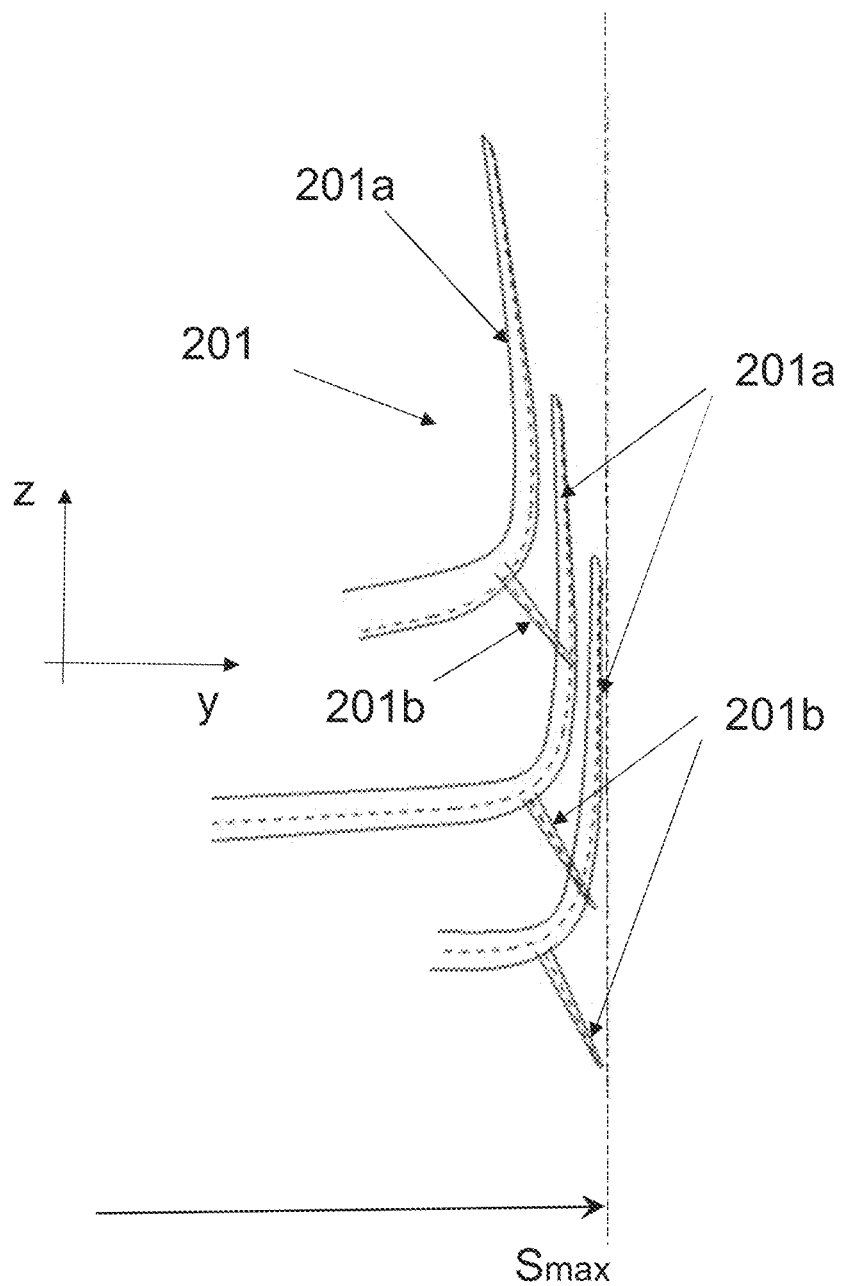
FIG. 7 overlays winglets of a second embodiment of the invention in one image.

Whilst the present invention has been described and illustrated with reference to the first embodiment, it will be appreciated by those of ordinary skill in the art that the invention lends itself to many different variations. By way of example, the winglet may also be used as part of a wing tip device having a downwardly extending winglet 201b. Such an embodiment is shown in FIG. 7, which illustrates such a wing tip device 201 in the three load conditions (worst-case static load (lower-most image), no-load condition (middle image), and 1-g flight load (upper-most image). The upwardly extending winglet 201a is essentially the same as the first embodiment, but the downwardly extending winglet 201b seeks to offset some of the span reduction experienced when the aircraft is in 1-g flight.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:
1. An aircraft comprising:
a wing, and
a winglet at an end of the wing, the winglet comprising:
  a root, a tip at an upper region of the winglet, a transition region extending away from the root; and a wing-like region extending from a distal end of the transition region to the tip,
wherein, when the aircraft wing is under a worst-case static loading, the tip of the winglet is located at a maximum spanwise extent of the winglet;

wherein, when the aircraft wing is under a no-load condition, the wing-like region is canted inboard with respect to a vertical plane such that the tip of the winglet is located inboard of the maximum spanwise extent of the winglet, and wherein the winglet while in the no-load condition has a shape corresponding to a jig shape of the winglet.

2. The aircraft according to claim 1, wherein the wing-like region comprises a planar portion extending to the winglet tip.

3. The aircraft according to claim 2, wherein when the aircraft wing is under the worst-case static loading, the planar portion extends vertically downward from the winglet tip such that the planar portion lies along the maximum spanwise extent of the winglet, and when the aircraft wing is in the no-load condition the planar portion is canted inboard with respect to the vertical plane.

4. The aircraft according to claim 2, wherein an entirety of the wing-like region is planar.

5. The aircraft according to claim 1, wherein when the aircraft is in flight under 1-g flight conditions, the wing-like region is canted further inboard, relative to when the aircraft wing is under the no-load condition, such that the tip of the winglet is located yet further inboard of the maximum span of the winglet.

6. A method of designing a winglet for an aircraft wing, the method comprising the steps of:
  (i) determining a maximum allowable wing span for the aircraft wing when it is under worst-case static loading;
  (ii) designing the winglet such that, when the aircraft wing is under worst-case static loading, a tip at an upper region of the winglet is located at a maximum winglet span of the winglet and the wing-like region is aligned with a vertical plane, wherein a maximum wing span of the aircraft wing when the winglet is at the maximum winglet span is no greater than the maximum allowable span of the aircraft wing, and
  (iii) designing a required jig shape of the winglet to achieve the winglet design of step (ii) by canting a wing-like region of the jig shape of the winglet inboard with respect to the vertical plane to locate the tip of the winglet inboard of the maximum span of the winglet, wherein the wing-like region extends from a tip of the winglet to a transition region of the winglet between the tip and a root of the winglet, wherein the jig shape of the winglet corresponds to a non-load condition of the winglet and the jig shape of the winglet positions a portion of the winglet beyond the maximum winglet span of the winglet.

7. The method of manufacturing a winglet, comprising:
designing a winglet using the method according to claim 6; and subsequently manufacturing the winglet to the design of the winglet.

8. An aircraft comprising a wing and a winglet at an end of the wing, and the winglet includes a wing-like region extending from a tip at an upper region of the winglet to a curved transition region of the winglet, and wherein when the aircraft wing is under a worst-case static loading, the wing-like region of the winglet extends vertically and upward, and when the aircraft wing is under a no-load condition, the wing-like region of the winglet is canted inboard with respect to a vertical plane such that a tip of the winglet is located inboard of a maximum spanwise extent of the winglet, and wherein the winglet while in the no-load condition has a shape corresponding to a jig shape of the winglet.

\* \* \* \* \*